May 4, 1937. G. J. EASTER ET AL 2,079,110
CERAMIC BONDED SILICON CARBIDE REFRACTORY
Filed Oct. 17, 1933
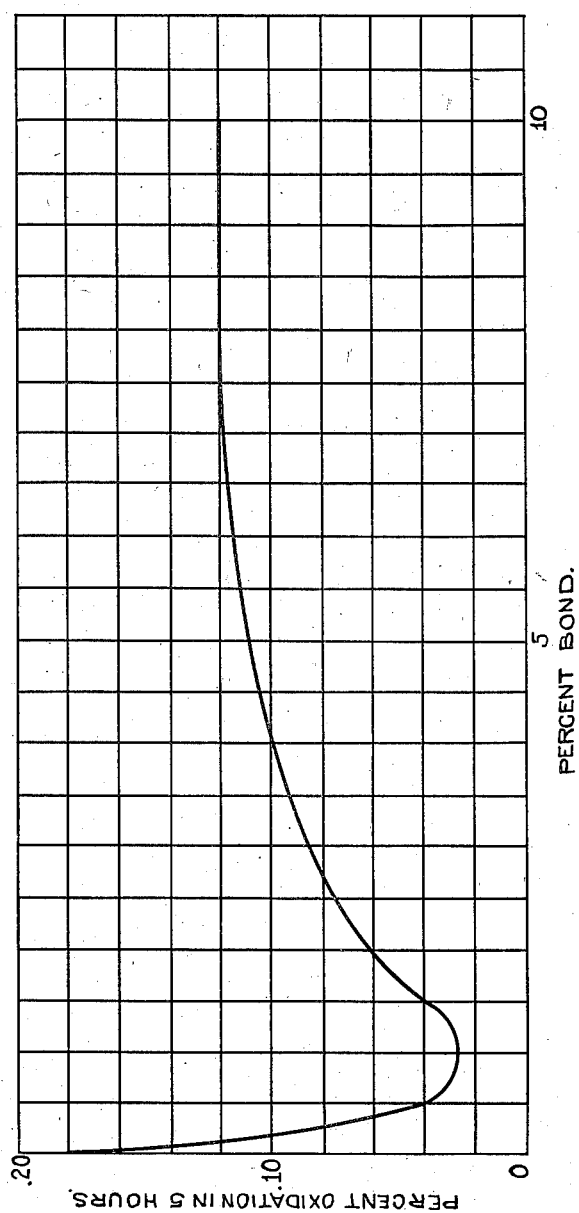
INVENTORS
GEORGE J. EASTER
CHARLES MCMULLEN
IAN M. LOGAN
BY
ATTORNEY.

Patented May 4, 1937

2,079,110

UNITED STATES PATENT OFFICE 2,079,110

CERAMIC BONDED SILICON CARBIDE REFRACTORY

George J. Easter and Charles McMullen, Niagara Falls, N. Y., and Ian M. Logan, Niagara Falls, Ontario, Canada, assignors, by mesne assignments, to The Carborundum Company, Niagara Falls, N. Y., a corporation of Delaware Application October 17, 1933, Serial No. 693,956

10 Claims. (Cl. 106—9)

This invention relates to silicon carbide refractories and the method of bonding them in such a way as to secure materially improved resistance to oxidation particularly by furnace gases while in service, and is in part a continuation of our copending application Serial No. 510,962, filed January 24, 1931.

Heretofore refractories made of this material have been greatly hampered for utilization in many applications by an excessive tendency to oxidize particularly at temperatures in the neighborhood of 1000° C. Numerous bonds, glazes, etc., for this type of refractory have been described from time to time in the patent art either with a hope of improving this resistance to oxidation or for other purposes. Such bonds, glazes, etc., have not satisfactorily solved the problem and there are instances where the best silicon carbide refractory hitherto produced has not lasted six months in service despite the fact that the temperature is far lower than that at which in other cases the same type of refractory lasts for years.

According to our invention we use ordinary refractory grade silicon carbide containing approximately 96%, SiC, 1.5% $SiO_2$, .45 to 1.8% iron or iron compounds (expressed as $Fe_2O_3$), .5 to 1.2% $Al_2O_3$, and a small amount of other impurities including C, Si, Na, Ca, etc., in variable and undetermined amounts and forms. To this material we have added a large variety of bonding materials in amounts from 0 to 25%. From these mixtures we have made bricks or briquettes and burned them to Cone 11-12 taking care in each case that the carbonaceous temporary binder used was properly burned out before vitrification of the refractory piece.

The resulting pieces have been tested for ability to resist oxidation by measuring the $CO_2$ evolved when they are alternately subjected to higher and lower pressure in an atmosphere of dry oxygen at a temperature of 1000° C. in a 27% chromium chrome-iron tube. The test is continued for five hours, the pressure being maintained at approximately atmospheric value except that every 15 minutes the gases are exhausted through "Ascarite" or other alkaline absorbent of $CO_2$, the pressure being reduced to 26″ vacuum at such times. Thereafter, fresh oxygen is admitted and the test repeated. In this way the oxygen is forced into the pores of the brick even through any glaze on its surface, and a "breathing action" is secured which we have found to be closely analogous to service conditions, although greatly accelerating the oxidation over the rate in commercial installations. A similar "breathing action" can be secured by increasing rather than reducing the pressure but we have found the method noted to be satisfactory and simpler to use.

The $CO_2$ formed during the test is weighed and the corresponding weight of oxidized SiC computed using the formula $$SiC + 2O_2 = SiO_2 + CO_2$$

This weight of silicon carbide is then expressed as a percentage of the weight of the test specimen for comparative purposes.

As a result of such tests we have found that the ability of silicon carbide refractories to resist oxidation varies over a wide range dependent on the bonding material used, its percentage, the firing conditions, etc., as had been expected. Contrary, however, to all expectations we have discovered that the maximum protection is not afforded by the percentages of bond commonly used and which from theoretical considerations had seemed to be most desirable, but rather by a much smaller percentage of the bond. This principle holds quite generally, so much so that we believe the use of the small percentage of bond to be as important as the nature of the bond, providing of course that the bond be inert toward silicon carbide and have a melting point low enough to permit proper vitrification and in excess of the temperature at which the ware is to be used, or in general above 1100° C., and not materially in excess of 1700° C.

The following data are typical of our findings and examples of the principle involved.

| Bond | Percent bond | Percent oxidation |
|---|---|---|
| A | 1.0 | 0.013 |
|   | 2.5 | .029 |
|   | 5.0 | .073 |
|   | 10.0 | .16 |
| B | 1 | 0.026 |
|   | 2.5 | .076 |
|   | 5 | .11 |
|   | 10 | .12 |
| C | 2.5 | 0.057 |
|   | 5 | .25 |
|   | 10 | .67 |
|   | 15 | .55 |
| D | 1 | 0.10 |
|   | 2.5 | 0.28 |
|   | 5 | .62 |
|   | 10 | 1.04 |
| E | 1 | 0.14 |
|   | 2.5 | .21 |
|   | 5 | .23 |
| F | 0 | 0.18 |

The compositions and approximate melting points of these bonds are as follows:

A—Powdered porcelain grog made from—
    15% feldspar
    20% ball clay
    35% Georgia kaolin
    30% flint
    ---------------- 1680° C.

B—"Keene" feldspar alone ---------------- 1250° C.
C—25% borax glass, 75% alumina ---------------- 1700° C.
D—75% fluorspar, 25% cryolite ---------------- 1255° C.
E—22% MgO, 78% $B_2O_3$ (calcined at 1350°) ---------------- 1400° C.
F—No bond added to the SiC.

All these bonds are refractory, having melting points in excess of 1100° C. in every case, and yet are not over 1700° C. In these bonds there is a flux present which permits the bond to soften to some degree materially below its final melting point, and hence to exert a strong bonding action at ordinary refractory kiln temperatures, such as Cone 11 noted below, although still retaining its strength at high temperatures, in contradistinction to the results where the bond is either entirely a flux or entirely highly refractory.

In explanation of the recorded facts the following hypothesis is offered. When the refractory is burned, the bond softens and together with the small amount of impurities present with the grain forms a film of ceramic material spread thinly over the surface of each crystal of silicon carbide. In order for this film to spread properly it must be relatively fusible at the outset, although it is desirable that it should not remain so fusible throughout the life of the refractory, hence the advantage of having a more refractory constituent in the bond to stiffen it after the film has formed. If the bond is present in too large a percentage, it immediately absorbs the fluid film and prevents its spreading to protect the crystals of silicon carbide. Similarly, if the bond is too refractory (that is, if its melting point is substantially above 1700° C.) the film is imperfectly formed and the results are not satisfactory. While this explanation as to the reason for the phenomena observed is theoretical, it seems to fit the facts closely and is set down as being of assistance in understanding the problem.

Figure 1 is a graph showing the rate of oxidation vs. percentage of bond in a characteristic case (Bond B).

As shown in Figure 1, the rate of oxidation is moderately high when no bond is added, drops very rapidly with increasing bond until 1% of bond is present, the exact minimum point varying dependent on the bond used, and after a certain point is passed the oxidation increases more slowly but steadily until 10% to 25% of bond is used. These latter percentages have heretofore been regarded as very desirable because of being those which mathematical calculation indicates should reduce the article to a state of minimum permeability by almost completely filling the pores between grains. Our work gives definite evidence however that they are too high.

In utilizing our discovery in the manufacture of superior commercial refractories, we take silicon carbide grain of the type described above, having a total impurity content not to exceed approximately 4%, and add to it finely pulverized bond in an amount of from .25% to not over 5% of the weight of the silicon carbide, the exact amount used being that which has been shown by oxidation test to give minimum oxidation of the bonded piece. For example, with Bond B (feldspar) we use 100 parts by weight of silicon carbide and 1 part of the bond.

In view of the low percentage of bond it is particularly desirable that it be finely ground (at least 100 mesh, or better still powdered in a ball mill) and that it be mixed with the silicon carbide in dry form in order to get as complete and uniform distribution of the bond throughout the mix as possible. While it is possible to omit this step of dry mixing, our experience is that the dry mixing gives materially better and more consistent results. The mixing may be done in any convenient device, a wooden barrel churn slowly rotated end over end for a half hour being suitable for this purpose.

When the bond has been thoroughly mixed dry, the dry mixture is transferred to a kneader or other type of mixer suitable for wet mixing and tempered with a liquid such as water plus some temporary binder such as sulfite pitch, dextrin or molasses until its consistency is right for molding. When the proper consistency is reached, the mix is pressed or tamped into the desired shapes. Slightly more temporary binder is usually required for tamping than is required for pressing. For simple shapes we prefer pressing at 2000 lbs. per sq. in. or over.

The pieces are next dried after molding. The low percentage of bond permits such relatively rapid drying without injury to the ware that most pieces can be placed directly in a dryer at 150° F. without damage. When they are thoroughly dry, the pieces may be coated with a glaze if so desired to improve their appearance or still further reduce oxidation, after which they are placed in the kiln to be burned. Burning at Cone 11 has been found very satisfactory when carried out in such a way that the carbonaceous material is completely burned out before the temperature is raised sufficiently to vitrify the bond.

We have found that the rate of oxidation may be further decreased by eliminating silicon carbide finer than approximately 200 mesh. This may be done by decanting or otherwise washing the fines out of the grain with water or by sifting, though the washing is easier and cheaper. The same condition is found with the washed grain as with unwashed, i. e. it is desirable to use a low percentage of bond. With fines-free grain and 10% of bond the oxidation rate is around .35% in 5 hours in a characteristic case (C bond) as compared with around .013% with 1% bond.

In order to be sure that the bricks having low bond percentage were not deficient in the various properties such as strength at high temperatures which are required of refractories in service, we have made many tests which indicate conclusively that they are satisfactory.

The following lists are representative:

| Bond | Percent bond | Lbs/sq. in mod. rupt. at 1350° C. | Percent spalling loss 20 blasts |
| --- | --- | --- | --- |
| A | 1 | Over 1470 | Nil. |
| B | 1 | Over 1360 | Nil. |
| C | 2½ | 345 | Nil. |
| Refractory clay | 8 | 685 | Nil. |
| Silicon carbide fines | 10 | Over 1500 | Nil. |

The latter two are made in accordance with Tone's Patents Nos. 1,204,211 and 772,262 and represent the best commercial practice heretofore.

Having thus described our invention in a full, clear and operatable manner, we claim:

1. A silicon carbide refractory comprising silicon carbide grain and an added bond, said bond comprising feldspar and constituting less than 2% of the batch by weight.

2. A silicon carbide refractory comprising silicon carbide grain and an added bond, said bond comprising a porcelain grog of about 15% of feldspar, 20% ball clay, 35% Georgia kaolin and 30% flint, and constituting less than 5% of the batch by weight.

3. A silicon carbide refractory comprising silicon carbide grain and an added bond, said bond comprising about 75% fluorspar and 25% cryolite and constituting less than 5% of the batch by weight.

4. A raw batch for the production of silicon carbide refractories, comprising silicon carbide grain of at least 95% purity and an added bond, said bond comprising feldspar and constituting less than 2% of the batch by weight.

5. A raw batch for the production of silicon carbide refractories, comprising silicon carbide grain of at least 95% purity and an added bond, said bond comprising porcelain grog of 15% feldspar, 20% ball clay, 35% Georgia kaolin and 30% flint and constituting less than 5% of the batch by weight.

6. A raw batch for the production of silicon carbide refractories, comprising silicon carbide grain of at least 95% purity and an added bond, said bond comprising about 75% fluorspar and 25% cryolite and constituting less than 5% of the batch by weight.

7. A raw batch for the manufacture of refractories consisting essentially of silicon carbide granules and less than two percent of a non-metallic ceramic binder consisting essentially of a refractory component and a flux therefor, whereby a portion of the binder is capable of melting at a temperature substantially lower than the refractory component to produce a fused binder having a melting point between 1100° C. and 1700° C.

8. A raw batch for the manufacture of refractories consisting essentially of silicon carbide granules substantially all larger than 200 mesh and less than two percent of a non-metallic ceramic binder consisting essentially of a refractory component and a flux therefor, whereby a portion of the binder is capable of melting at a temperature substantially lower than the refractory component to produce a fused binder having a melting point between 1100° C. and 1700° C.

9. A refractory article consisting essentially of silicon carbide granules substantially all larger than 200 mesh and less than two percent of a non-metallic ceramic binder therefor consisting of a fused mixture of metallic oxides and having a melting point between 1100° C. and 1700° C., the said granules being substantially inclosed in films of binder whereby they are protected from oxidation.

10. A refractory article consisting essentially of silicon carbide granules and less than two percent of a non-metallic ceramic binder therefor consisting of a fused mixture of metallic oxides and having a melting point between 1100° C. and 1700° C., the said granules being substantially inclosed in films of binder whereby they are protected from oxidation.

GEORGE J. EASTER.
CHARLES McMULLEN.
IAN M. LOGAN.